(No Model.)
E. HEYLYN.
PAVEMENT.
No. 269,289.
Patented Dec. 19, 1882.
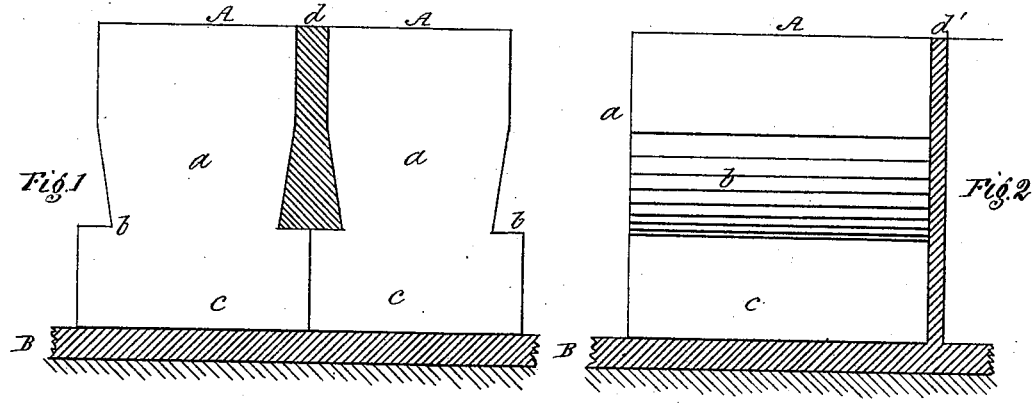
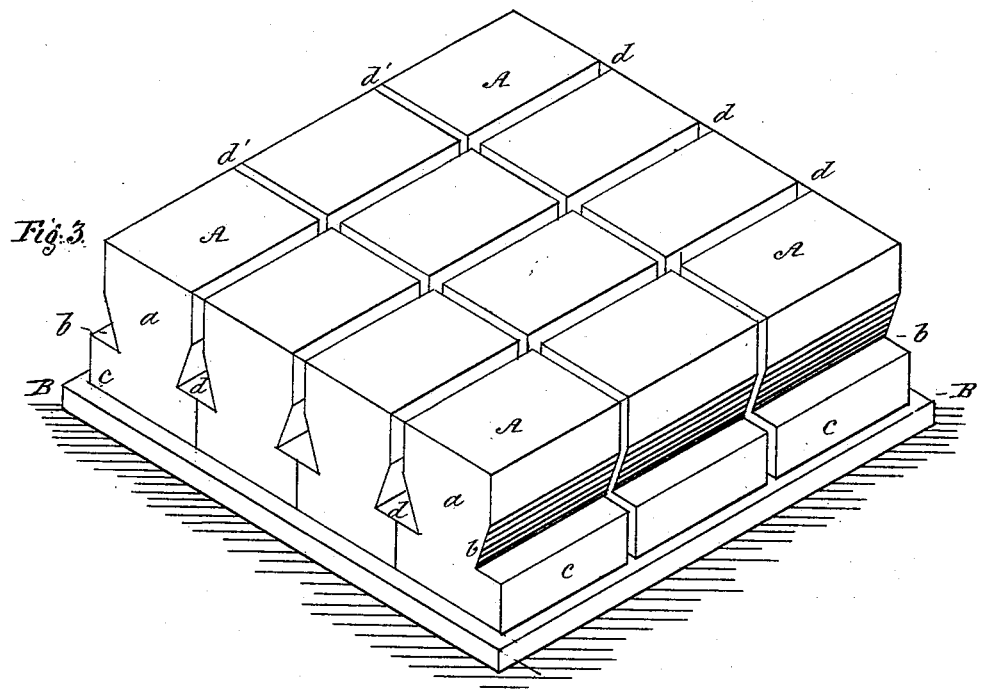
Witnesses:
M. H. Topping
Aubrey C. Wilson
Inventor:
Edward Heylyn.
By
John S. Thornton
Attorney.

UNITED STATES PATENT OFFICE.

EDWARD HEYLYN, OF BROOKLYN, NEW YORK.

PAVEMENT.

SPECIFICATION forming part of Letters Patent No. 269,289, dated December 19, 1882.

Application filed July 24, 1882. (No model.)

*To all whom it may concern:*

Be it known that I, EDWARD HEYLYN, a citizen of the United States, residing in the city of Brooklyn, in the county of Kings and State of New York, have invented a new and useful Improvement in Wooden Pavements; and I hereby declare the following to be a full, clear, and exact description thereof, reference being had to the accompanying drawings, which form a part of this specification.

This invention relates to an improvement in the construction of wooden pavements, and is chiefly applicable for streets and roadways, but may also be used for sidewalks, the floors of stables and warehouses, and other purposes where a strong, hard, and durable surface is required.

The object of the invention is to obviate the difficulties which have heretofore been encountered in the use of pavements made from wooden blocks by constructing the same in such manner that no moisture can be absorbed by the wood from below, and so that the pavement, when completed, will form a thoroughly united and unbroken mass, which cannot be destroyed or injured by any force or pressure which, under ordinary circumstances, can be brought to bear upon a pavement.

The invention consists in a pavement composed of wooden blocks of the form hereinafter described, and a cement filling, composed of the ingredients hereinafter specified in about the proportions stated and compounded in the manner set forth, the whole being laid upon an impervious foundation or bed, as hereinafter particularly described.

In the accompanying drawings, Figure 1 represents an end elevation of two adjoining blocks with a filling of cement or concrete, and laid upon a cement or concrete bed. Fig. 2 is a side elevation of one of the blocks and part of an adjoining block, and Fig. 3 a perspective view of a series of blocks in position to form a pavement, and showing the spaces which are to receive the cement or concrete.

Similar letters of reference indicate the same parts in all the several figures.

A represents the wooden blocks, set with the grain perpendicularly, as usual, and made in the form shown—that is to say, the ends $a$ present a plan surface; but a triangular groove, $b$, is cut out on each side of the block, and the rectangular base $c$ is slightly wider than the body or upper portion of the block. This forms a space, $d$, between the sides of adjoining blocks which is about three times as wide at the bottom as it is at its top, and the joint formed by the adjoining bases $c$ is immediately under the center of said space.

$d'$ represents the space between the ends of adjoining blocks, which may be narrower than $d$. Into these spaces $d$ and $d'$ the cement or concrete filling is rammed when the pavement is laid. It will be seen that this form of block possesses peculiar advantages for obtaining a perfect interlocking of the same with the cement.

B represents a concrete bed or foundation upon which the pavement is laid. This may be of any of the concretes or cements in ordinary use for such purposes, or of the cement I employ for the filling in the spaces $d$ and $d'$; but I prefer to use a cement for both purposes compounded in manner following, namely: I take one hundred pounds of strained resin and ten pounds of the residuum or dead-oil of petroleum, more or less, and about one-half pound of sulphuric acid, which I boil together in a suitable vessel. When this mixture boils I stir in one hundred pounds of calcined plaster-of-paris, or of chalk or lime, mixing the ingredients thoroughly while boiling. I then add five hundred pounds, or more, of clean sharp sand and gravel or broken stones which have been previously heated and dried to expel all dampness therefrom. After the whole has been thoroughly mixed and has boiled for about ten minutes it is ready for use. It is applied while hot. The foundation or bed B, when made of this cement, is laid in the usual manner, and in filling in the spaces $d$ $d'$ the cement is poured in and well rammed with heated iron tamps.

This cement is extremely hard and strong, being capable of bearing a crushing force equal to twice such force that Portland cement will bear, and it possesses the quality of uniting inseparably with the wood, so that the whole pavement forms a united mass which can only be separated by breaking away the wood.

When the pavement has been laid the surface of the blocks may be coated with a mixture of melted resin, dead-oil, and plaster-of-paris in suitable proportions; and if the pavement is laid on an ordinary foundation, the blocks, before being laid, may be coated with a similar mixture on the under surface to repel moisture.

When the foundation or bed is made from my improved cement, a much larger proportion of sand or gravel than that above specified may be used—say about twice the quantity above specified.

I am aware that pavements have been made composed of wooden blocks of various forms having sloping or inclined sides and a filling of sand, asphalt, and similar materials, and I do not claim that as my invention. In my improvement the composition of the cement filling, taken in connection with the described form of blocks, constitutes the invention.

What I claim as my invention is—

A pavement composed of wooden blocks A, each having a rectangular base, $c$, and a triangular groove, $b$, along each side, as shown and described, and a cement filling, $d\ d'$, composed of strained resin, residuum of petroleum, calcined plaster-of-paris, or its equivalent, sulphuric acid, and sand or gravel, in about the proportions and compounded and applied in the manner hereinbefore specified.

EDWARD HEYLYN.

Witnesses:
JOHN S. THORNTON,
M. H. TOPPING.